United States Patent
Russell et al.

(10) Patent No.: US 12,259,282 B2
(45) Date of Patent: Mar. 25, 2025

(54) HYBRID CALORIMETER CELL

(71) Applicant: Waters Technologies Corporation, Milford, MA (US)

(72) Inventors: Donald J. Russell, Orem, UT (US); Anthony E. Arnerich, Fort Collins, CO (US); David Serrell, Draper, UT (US)

(73) Assignee: Waters Technologies Corporation, Milford, MA (US)

( * ) Notice: Subject to any disclaimer, the term of this patent is extended or adjusted under 35 U.S.C. 154(b) by 515 days.

(21) Appl. No.: 17/521,966

(22) Filed: Nov. 9, 2021

(65) Prior Publication Data
US 2022/0065712 A1 Mar. 3, 2022

Related U.S. Application Data

(63) Continuation of application No. 16/040,873, filed on Jul. 20, 2018, now Pat. No. 11,221,260.

(60) Provisional application No. 62/553,124, filed on Aug. 31, 2017.

(51) Int. Cl.
*G01K 17/04* (2006.01)
*G01N 25/48* (2006.01)

(52) U.S. Cl.
CPC ......... *G01K 17/04* (2013.01); *G01N 25/4853* (2013.01); *G01N 25/486* (2013.01); *G01N 25/4866* (2013.01)

(58) Field of Classification Search
CPC .......................... G01K 17/04; G01N 25/4853
See application file for complete search history.

(56) References Cited

U.S. PATENT DOCUMENTS

| | | | |
|---|---|---|---|
| 3,327,193 A | 6/1967 | Hans | |
| 4,783,174 A | 11/1988 | Gmelin et al. | |
| 5,163,753 A | 11/1992 | Whiting et al. | |
| 5,813,763 A * | 9/1998 | Plotnikov | G01N 25/4866 422/51 |
| 7,318,671 B1 | 1/2008 | Moghaddam et al. | |
| 2002/0041619 A1 | 4/2002 | Merzliakov et al. | |
| 2005/0190813 A1 | 9/2005 | Schick | |
| 2008/0052032 A1 | 2/2008 | Danley | |
| 2008/0304540 A1 | 12/2008 | Danley | |

(Continued)

FOREIGN PATENT DOCUMENTS

| CN | 104391005 A | 3/2015 |
|---|---|---|
| CN | 105209872 A | 12/2015 |

(Continued)

OTHER PUBLICATIONS

Translation of RU2583061C1 (2016).*

(Continued)

*Primary Examiner* — Mirellys Jagan
(74) *Attorney, Agent, or Firm* — Schmeiser, Olsen & Watts LLP

(57) ABSTRACT

A calorimeter and method is also provided, including a sample cell, a reference cell, a thermostat in thermal communication with the sample cell and the reference cell, a first conductive wire, the first conductive wire having a first end connected to the thermostat and a second end connected to the sample cell, and a second conductive wire, the second conductive wire having a first end connected to the thermostat and a second end connected to the reference cell.

18 Claims, 7 Drawing Sheets

(56) References Cited

U.S. PATENT DOCUMENTS

| | | | |
|---|---|---|---|
| 2010/0238968 A1 | 9/2010 | Plotnikov et al. |
| 2013/0208759 A1 | 8/2013 | Danley et al. |
| 2014/0291526 A1 | 10/2014 | Killich |
| 2016/0216259 A1 | 7/2016 | Chang et al. |
| 2017/0227480 A1 | 8/2017 | Russell et al. |

FOREIGN PATENT DOCUMENTS

| | | | | |
|---|---|---|---|---|
| CN | 106950250 A | | 7/2017 | |
| DE | 19731157 A1 | | 2/1999 | |
| DE | 19825676 A1 | * | 12/1999 | ......... G01N 25/4866 |
| EP | 0884585 A2 | | 12/1998 | |
| EP | 1859258 A1 | | 11/2007 | |
| EP | 2988119 A1 | | 2/2016 | |
| FR | 2050676 A | * | 4/1971 | ............. G01K 17/00 |
| JP | H063301 A | * | 1/1991 | |
| JP | 2009053143 A | | 3/2009 | |
| JP | 2014149158 A | | 8/2014 | |
| RU | 2583061 C1 | | 5/2016 | |

OTHER PUBLICATIONS

Translation of JPH063301A (1994).*

International Preliminary Report on Patentability in International Patent Application No. PCT/US2018/043004 mailed on Mar. 12, 2020.

Non-Final Office Action in U.S. Appl. No. 16/040,873 mailed on Jul. 9, 2020.

Final Office Action in U.S. Appl. No. 16/040,873 mailed on Jan. 21, 2021.

Non-Final Office Action in U.S. Appl. No. 16/040,873 mailed on Jun. 9, 2021.

Notice of Allowance in U.S. Appl. No. 16/040,873 mailed on Sep. 28, 2021.

International Search Report and Written Opinion in PCT/US2018/043004 mailed on Jan. 7, 2019.

Examination Report in European Patent Application No. 18750074.9 mailed on Mar. 1, 2023.

Kulagin V I, "Thermophysical Measurements: Differential Calorimeter for Studying Composites," Mar. 1, 1994, Measurement Techniques, vol. 37, pp. 308-312.

Examination Report in European Patent Application No. 18750074.9 mailed on May 25, 2022.

Yao, et al. "ac nanocalorimeter for measuring heat capacity of biological macromolecules in solution" Review of Scientific Instruments, vol. 74, No. 9, Sep. 2009.

Danaceau, et al. "Hydrophilic interaction chromatography (HILIC) for L ✖ MS/MS analysis of monoamine neurotransmitters" Bioanalysis, vol. 4, No. 7, Apr. 18, 2012.

Bao, et al. "Study on Temperature Following Control Strategy for Strong-Coupled Dual-Channel Thermal Analysis Furnace" Measurement and Control Technology, vol. 35, Iss. 5, 2016.

Summons to Attend Oral Proceedings in European Patent Application No. 18750074.9 mailed on Sep. 26, 2024.

"Hastelloy C-276 alloy datasheet" Dec. 31, 1997, pp. 1-16.

Ostrovskii, Victor E "Differential microcalorimeter for isothermal measurements of heat effects in two-phase systems and examples of its application" Review of Scientific Instruments, vol. 73, Mar. 1, 2002, pp. 1304-1312.

* cited by examiner

HYBRID CALORIMETER CELL

RELATED APPLICATIONS

This application is a continuation application of U.S. patent application Ser. No. 16/040,873 filed on Jul. 20, 2018, entitled "HYBRID CALORIMETER CELL," which claims priority to U.S. Provisional Patent Application No. 62/553,124, filed Aug. 31, 2018, entitled "CHEMICALLY INERT SAMPLE CELLS FOR CALORIMETRY," both of which are incorporated herein by reference.

FIELD OF TECHNOLOGY

The following relates to calorimetry, and more specifically to embodiments of a hybrid calorimeter cell used in Isothermal Titration calorimetry (ITC) and Differential Scanning calorimetry (DSC).

BACKGROUND

Using low thermally conductive materials to comprise a sample cell in isothermal titration calorimetry and differential scanning applications can degrade a performance of the calorimeter. For example, low thermally conductive materials forming the cell body can lead to a longer equilibration time after loading a sample within the sample cell, as well as difficulty in maintaining a time constant for measuring a heat signal. Materials having suitably high thermally conductive materials may not be chemically compatible with samples to be tested by the calorimeter.

Thus, a need exists for an apparatus and method for an improved calorimeter cell.

SUMMARY

A first aspect relates generally to a calorimeter cell of a calorimetry system, comprising: a cell body having an internal region for receiving a first substance, the cell body comprising a chemically inert material, and a thermally conductive layer at least partially surrounding the chemically inert cell body, the thermally conductive layer being more thermally conductive than the chemically inert layer.

A second aspect relates generally to a calorimeter comprising: a sample cell, a reference cell, a thermostat in thermal communication with the sample cell and the reference cell, a first conductive wire, the first conductive wire having a first end connected to the thermostat and a second end connected to the sample cell, and a second conductive wire, the second conductive wire having a first end connected to the thermostat and a second end connected to the reference cell.

A third aspect relates generally to a method comprising attaching a thermally conductive layer to an exterior surface of a cell body of a calorimeter cell, the cell body comprising a chemically inert material, and connecting the thermally conductive layer to a thermostat of the calorimeter with a conductive wire.

The foregoing and other features of construction and operation will be more readily understood and fully appreciated from the following detailed disclosure, taken in conjunction with accompanying drawings.

BRIEF DESCRIPTION OF THE DRAWINGS

Some of the embodiments will be described in detail, with reference to the following figures, wherein like designations denote like members, wherein.

DETAILED DESCRIPTION

Figure 1:
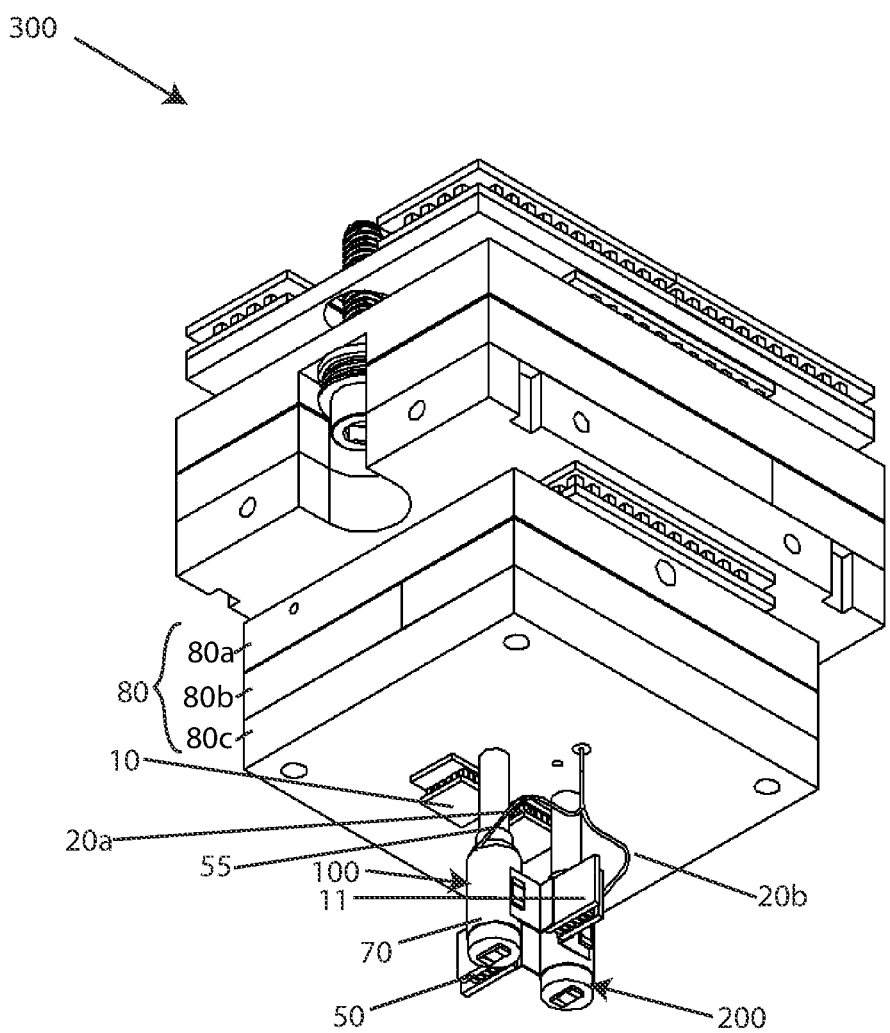
FIG. 1 perspective of a calorimeter having a sample cell and a reference cell, in accordance with embodiments of the present invention.

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

Isothermal titration calorimetry is a technique in which the thermodynamic properties of interactions of solutions are determined. For example, exothermic or endothermic reactions produce heat which can be measured using an isothermal titration calorimeter (ITC). Such reactions include the binding of small molecules to macromolecules. Typical ITCs include a reference cell and a sample cell. The reference cell contains a reference liquid such as water and the sample cell holds a sample solution containing a first substance. A constant cooling power is applied to the sample cell. Temperature sensing circuitry is used to detect a temperature difference between the reference cell and the sample cell. A feedback circuit controls a heater for the sample cell to maintain equal cell temperatures. As a titrant containing a second test substance is injected into the sample cell in accurately controlled volumes, heat is either generated or absorbed according to the type of reaction between the first and second test substances. Consequently, the power supplied by the heater to the sample cell will change so that the temperatures of the two cells remain equal. This power is monitored over time and results in a series of peaks being observed with each peak corresponding to an injection of the test solution into the sample cell. Each peak can be integrated over time to yield the total heat generated for the injection. The detected peaks yield information on the thermodynamic parameters of the interaction of the test substances.

During a single injection, the titrant may not immediately disperse throughout the volume of the sample solution and therefore the reaction is observed over a finite time corresponding to the width of the observed peak. To mix the solutions more rapidly, a stirring paddle is rotated inside the sample cell. The stirring paddle may include a hollow shaft with a stirring blade attached at the end of the shaft inside the sample cell. The injection may be introduced into the sample cell through the hollow shaft and through a bore in the paddle blade. Other injection and stirring mechanisms may include a stirring paddle that is separate from the injection needle.

Furthermore, according to some embodiments, calorimeter cells, such as the reference cell and the sample cell, may be made from low thermally conductive materials that are otherwise suitable for contact with a sample. A low thermally conductive material used in cell construction may be a nickel-based alloy. Some suitable nickel-based alloys are available under the HASTELLOY brand (available from Hynes International, Inc. of Kokomo, Ind.). These suitable alloys are nickel-based alloys that optionally include molybdenum and optionally also chromium. More generally, the range of HASTELLOY alloys contain different amounts of nickel (e.g. by weight percent) with varying amounts (e.g. by weight percent) of molybdenum, chromium, iron, tungsten, manganese, cobalt, aluminum, titanium, silicon, carbon, niobium, vanadium, copper, tantalum, and zirconium. These low thermally conductive materials may be used in calorimeter cell construction because they are suitably chemically inert, allowing for a variety of sample types to be tested and with, for example, aggressive chemical cleaning between tests. However, issues with performance may arise when using such chemically inert materials in the calorimeter cell due to the poor thermal conductivity. For example, sample cells constructed from nickel-based alloys can suffer from degradation in signal, responsiveness, and time constant compared to highly thermally conductive materials.

Accordingly, embodiments of the present invention provide a calorimeter sample cell used in ITC and DSC that: 1) is sufficiently chemically inert to allow for a variety of sample types as well as aggressive chemical cleaning, 2) is sufficiently thermally conductive to quickly conduct heat from the sample through the sample cell and to the thermal sensor so as to yield, for example, the highest sensitivity and response time possible for the calorimeter, and optionally 3) has a sufficient thermal connection to a thermostat of the calorimeter that the connection facilitates a newly loaded sample to quickly thermally equilibrate while not being so thermally conductive to the thermostat as to negatively impact sensitivity.

Referring to the drawings, FIG. 1 depicts a perspective of a calorimeter 300 having a sample cell 100 and a reference cell 200, in accordance with one embodiment of the present invention. The sample cell 100 is a hybrid cell including a chemically inert, very thin-walled sample cell body 50 with a highly thermally conductive material adhered to the exterior of the sample cell body 50. The sample cell body may be comprised of nickel-based alloy. In the sample cell 100, the heat conduction path through the thin wall of the chemically inert cell body is sufficiently short, so heat is conducted through the thin cell wall to the thermally conductive exterior of the cell without a substantially significant increase in cell response time. The cell body 50 has an internal region 57 for receiving a first substance, the cell body 50 being comprised of a thin walled chemically inert material. A highly thermally conductive layer 70 at least partially surrounds the thin walled chemically inert cell body 50. Furthermore, the calorimeter 300 may include a constant cooling thermoelectric device (TED) 10 and a sensor 11 proximate the sample cell 100 and the reference cell 200.

Figure 2:
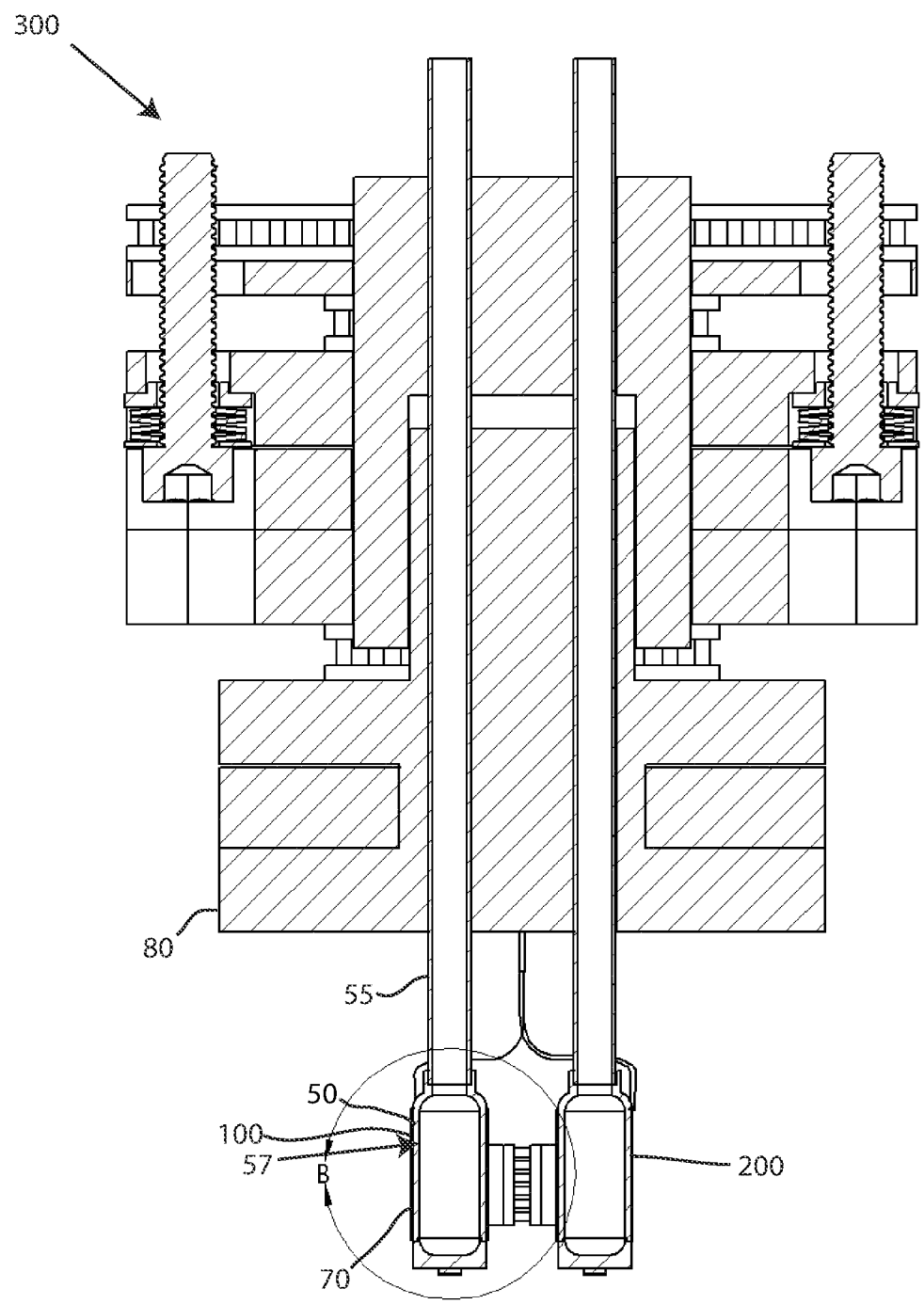
FIG. 2 depicts a cross-sectional view of FIG. 1, in accordance with embodiments of the present invention.

FIG. 2 depicts a cross-sectional view of the calorimeter 300 depicted in FIG. 1. The sample cell 100 and the reference cell 200 share a common heat sink. Alternative embodiments of a cell body may be cylindrical, such as for ITC applications, or may be a wrapped capillary cell, such as for DSC applications. The cell body 50 is configured to receive a first substance (e.g. a sample solution) in an interior region 57 of the sample cell 100. During operation of the calorimeter 300, the cell body 50 may also receive a second substance, such as a titrant injected into the cell body 50.

The cell body 50 of the sample cell 100 is formed of a chemically inert material. Chemically inert materials may allow for a variety of sample types to be tested and aggressive chemical cleaning between tests. The chemically inert material has a relatively low thermal conductivity. An exemplary embodiment of the cell body 50 is comprised of a chemically inert, low thermally conductive material with a thermal conductivity less than 100 W/mK. Alternatively, the thermal conductivity of the cell body 50 is 1-9 W/mK, 10-20 W/mK, 20-30 W/mK, 30-40 W/mK, 40-50 W/mK, 50-60 W/mK, 70-80 W/mK, 80-90 W/mK, or 90-100 W/mK. Further, the low thermal conductivity material of the cell body 50 may be at least 10 times less thermally conductive than a relatively high thermally conductive material at least partially surrounding the cell body 50.

As described earlier, optional chemically inert materials having a low thermal conductivity include some nickel-molybdenum and nickel-chromium-molybdenum alloys or titanium, and tantalum. Other embodiments of a chemically inert material having a low thermal conductivity include stainless steel, or other nickel-based alloys. In an exemplary embodiment, the cell body 50 is comprised of a HASTELLOY C category alloy (e.g. Haynes International brands C-4 alloy, C-22 alloy, C-22HS alloy, C-276 alloy and C-2000 alloy).

Figure 3:
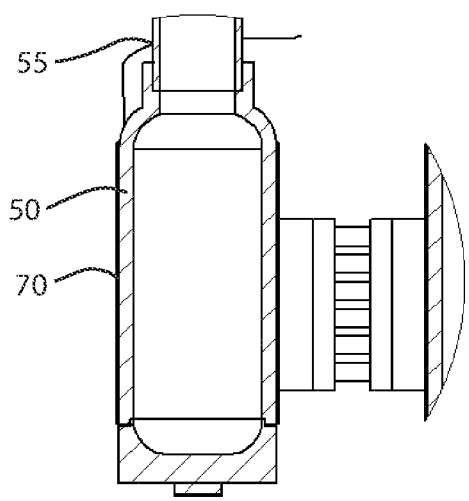
FIG. 3 depicts a detailed view of an encircled area K of FIG. 2, in accordance with embodiments of the present invention.

FIG. 3 depicts a detailed view of an encircled area K of FIG. 2 The cell body 50 has a very-thin wall, as shown in FIG. 3. The very-thin wall or thin-wall may refer to a wall (e.g. thin-walled) of the cell body 50 comprised of the chemically inert, low thermally conductive material. The wall thickness of the cell body 50 may be as thin as possible while also maintaining a structural integrity of the cell body 50 (e.g. maintaining a sufficient rigidity). The wall thickness of the cell body 50 may be less than a $1/16^{th}$ of an inch (1.5875 mm). In other embodiments, the thin-walled cell body 50 may have a wall thickness less than a $1/32^{nd}$ of an inch (0.7938 mm). In an exemplary embodiment, the wall thickness of the very-thin walled cell body 50 may be between 0.02 inches and 0.01 inches (0.508 mm-0.254 mm), or less than ten-thousandths of an inch. Constructing the wall or walls of the cell body 50 with a small thickness reduces a path length between the interior region 57 and an exterior surface of the cell body 50. For example, heat being conducted through the wall(s) of the cell body 50 has a very short path length through the low thermally conductive material of the cell body 50. The heat conducted through the thin-wall of the cell body 50 reaches a highly conductive layer 70 having a higher thermal conductivity. For instance, the highly conductive layer 70 may be attached, adhered, fastened, molded, or otherwise coupled to the cell body 50.

A highly thermally conductive layer may be a separate layer or wrap adhered to an exterior surface of a cell body. The layer may surround or partially surround a cell body.

When a titrant containing a second substance is injected into the interior region 57 of the cell body 50, heat produced from an exothermic reaction of the first substance (e.g. sample solution) and the second substance is conducted across a short path length of the thin walled chemically inert and low thermally conductive cell body 50 and then through the highly thermally conductive layer 70 to the sensor 11 between the sample cell 100 and the reference cell 200. Additionally, the layer 70 may surround or partially surround the cell body 50, such that after a titrant containing a second substance is injected into the interior region 57 of the cell body 50, a heat applied by the thermostat 80 to restore equilibrium temperature between a sample cell temperature and a reference cell temperature is conducted across a short path length of the thin walled chemically inert and low thermally conductive cell body 50 through the highly thermally conductive layer 70.

The layer 70 is comprised of a highly thermally conductive material, such as gold, silver, copper, or aluminum. Further highly conductive materials may be both metals and non-metals, including synthetic materials. An exemplary embodiment of the highly thermally conductive layer 70 may have a thermal conductivity greater than a 100 W/mK. For instance, the layer 70 may have a thermal conductivity at least 10 times greater than the low thermally conductive cell body 50. In other exemplary embodiments, the thermal conductivity of layer 70 may be greater than a 100 W/mK, greater than 200 W/mK, greater than 300 W/mK, or greater than 400 W/mK. Moreover, the layer 70 may have a thickness or wall thickness greater than 0.02 inches (0.508 mm). In an exemplary embodiment, the layer 70 may have a thickness between 0.02 (0.508 mm) and 0.1 inches (2.54 mm). A thickness ratio between the thickness of the layer 70 and the wall thickness of the cell body 50 may be between 1:1 and 100:1.

Optionally, for example, the cell body 50 has a gold layer 70 adhered to the cell body 50, wherein a thickness of at least a portion of the cell body 50 is between 0.01 inches and 0.02, and a thickness of the gold layer 70 adhered to the cell body 50 is greater than 0.02 inches.

Referring back to FIG. 2, the sample cell 100 may include an access tube 55. Embodiments of the cell body 50 may be attached, fastened, adhered, or otherwise coupled to the access tube 55. The access tube 55 may be a tube, a cylinder, a pathway, a connection, a pipe, a conduit, a channel, and the like, which may have a generally axially opening therethrough. In ITC applications, the access tube 55 may be configured to receive a blade 14 (shown in FIG. 5) that passes through the access tube 55 and extends into the sample cell 100; the titrant containing a second substance for reaction with the sample solution within the sample cell 100 may be injected into the sample cell via the access tube 55. Moreover, embodiments of the access tube 55 may be in thermal and mechanical contact with the thermostat 80. For instance, without conductive wires 20a, 20b, described in greater detail infra, the only connection between the sample cell 100 and the thermostat 80 may be through the access tube 55. In an exemplary embodiment, the access tube 55 may be comprised of a same material as the cell body 50, such as a nickel-molybdenum alloy.

Additionally, the calorimeter 300 may include a reference cell 200. Embodiments of the reference cell 200 may also include a cell body and an access tube. The cell body of the reference cell may be a body portion, a structural component forming the reference cell, a reference containing component, a vessel, a container, and the like. Embodiments of the cell body of the reference cell may be cylindrical, such as with ITC applications, or may be a wrapped capillary cell, such as with DSC applications. The cell body of the reference cell may be configured to receive a liquid reference substance in an interior region of the reference cell 200. In an exemplary embodiment, the reference cell 200 may include the same or substantially the same construction as the sample cell 100, as described above. For example, the reference cell 200 may include a cell body comprised of a chemically inert, low thermally conductive material, wherein a layer or portion of a highly conductive material, such as gold, aluminum, or copper, is attached to the cell body of the reference cell.

Figure 4:
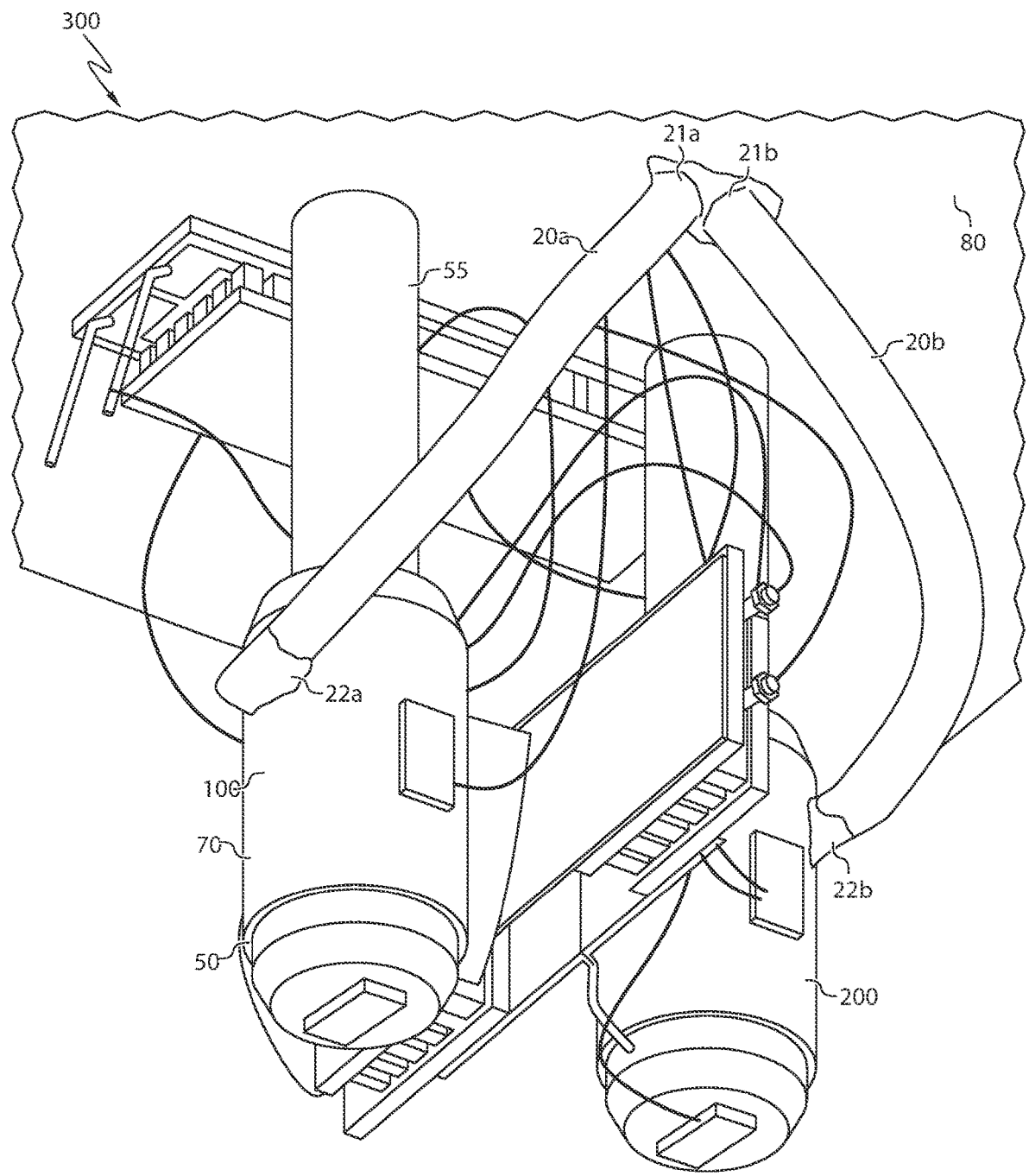
FIG. 4 depicts a perspective view of a calorimeter construction having conductive wires connecting to the calorimeter cells, in accordance with embodiments of the present invention.

FIG. 4 depicts a perspective view of a calorimeter construction having conductive wires 20a, 20b connecting to the calorimeter cells 100, 200, in accordance with embodiments of the present invention. As mentioned above, without a first conductive wire 20a and a second conductive wire 20b, the only connection to the thermostat 80 is through the access tubes 55, resulting in longer than desired thermal equilibration after loading a new sample. To address this issue, the calorimeter 300 may employ two conductive wires 20a, 20b that connect the highly thermal conductive layer 70 to a thermostat of the calorimeter 300.

Figure 7:
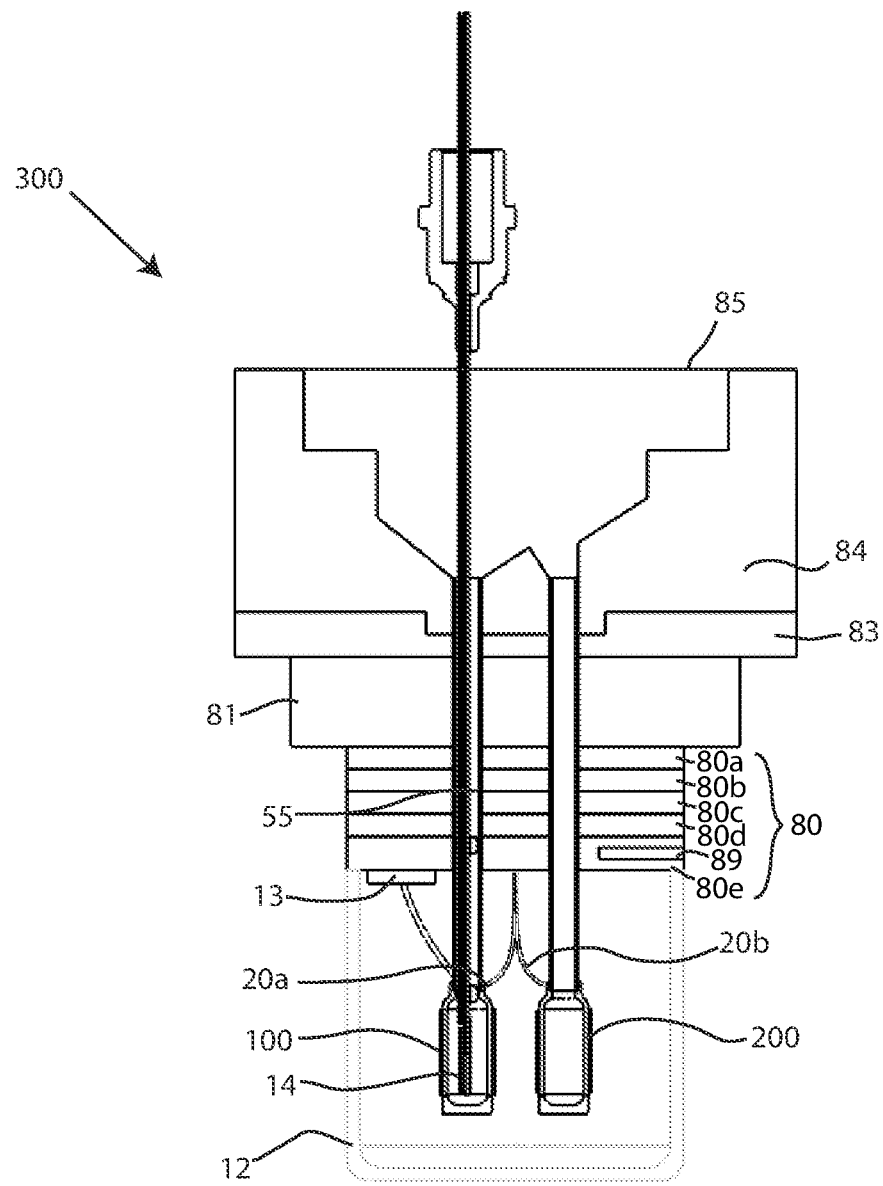
FIG. 7 depicts a schematic view of a calorimeter that may use calorimeter cells in accordance with embodiments of the present invention.

Thermostats, such as the thermostat 80 shown in the drawings, may include a diffusion bonded block, wherein the diffusion bonded block may include a plurality of diffusion bonded layers 80a, 80b, 80c. In FIG. 1, the thermostat 80 includes three diffusion bonded layers 80a, 80b, 80c. However, the thermostat 80 may include more than three bonded layers, such as layers 80a, 80b, 80c, 80d, 80e, as shown in FIG. 7. Embodiments of the thermostat 80 may include a temperature sensor 89 disposed within the diffusion bonded block for measuring a temperature of the diffusion bonded block. A thermostat of calorimeter 300 may be a component in a temperature control subsystem, a temperature controller, a temperature regulating device, and the like, which may control a temperature of a calorimeter block (e.g. diffusion bonded block shown in the drawings) to which the cells 100, 200 can be mounted. A temperature of the thermostat may be measured by a temperature sensor within the thermostat and a temperature measurement module associated with a calorimeter computer. An output of the temperature measurement module may be provided via an electrical connection as an input to temperature control algorithm in temperature control software of the calorimeter computer so that temperature control algorithm can control the temperature of thermostat. Embodiments of the thermostat of calorimeter 300 may be connected to a temperature subsystem including plurality of layers/modules of temperature control.

In an exemplary embodiment, a first end 21a of the first conductive wire 20a may be connected (e.g. soldered) to a surface of the thermostat 80 of the calorimeter 300, and a second end 22a of the first conductive wire 20a may be connected (e.g. soldered) to a surface of the layer 70 of the sample cell 100. Similarly, a first end 21b of the second conductive wire 20b may be connected (e.g. soldered) to a surface of the thermostat 80 of the calorimeter 300, and a second end 22b of the second conductive wire 20b may be connected (e.g. soldered) to a surface of a highly thermally conductive layer of the reference cell 200. In an exemplary embodiment, the first end 21a of the first conductive wire 20a and the first end 21b of the second conductive wire 20b are connected to the thermostat 80 at a same location on the thermostat 80. Connecting the wires 20a, 20b at a same location on a surface of the thermostat 80 may allow for any thermal noise traveling through the wires 20a, 20b to be detected as the same thermal noise spike. Alternatively, the ends 21a, 21b may be connected to the thermostat 80 at different locations along the surface of the thermostat 80. In an exemplary embodiment, the conductive wires 20a, 20b may be wrapped or otherwise insulated by an insulating material to prevent or hinder heat loss from the wires 20, 20b.

The first conductive wire 20a and the second conductive wire 20b may supply an adequate thermal conduction between the thermostat 80 and the sample cell 100 and reference cell 200, respectively, to allow for a reasonable equilibration time. For instance, the conductive wires 20a, 20b may establish a highly thermally conductive path from the thermostat 80 directly to the cells 100, 200, and in particular to the highly thermal conductive layer attached to the cell body, as opposed to relying solely on the conductive path from the access tube to the cell body across a chemically inert, low thermally conductive material comprising the access tube and cell body 50. The time it takes to supply the necessary heat to restore equilibrium temperatures between the cells 100, 200 post reaction within the sample cell 100 may be reduced by conducting heat across the direct path from thermostat 80 to cell 100, 200 via wires 20a, 20b of highly conductive material (e.g. copper). In other words, the conductive wires 20a, 20b connecting the thermostat 80 to the cells 100, 200 may avoid time delays that may be present when heat is conducted across a long path length of material having poor thermal conductivity, such as a nickel-based alloy. Further, embodiments of the calorimeter 300 may utilize a common source for potential noise, which allows for differential subtraction of the thermal noise transmitted through the conductive wires 20a, 20b, such that the calorimeter signal is not adversely impacted.

Figure 5:
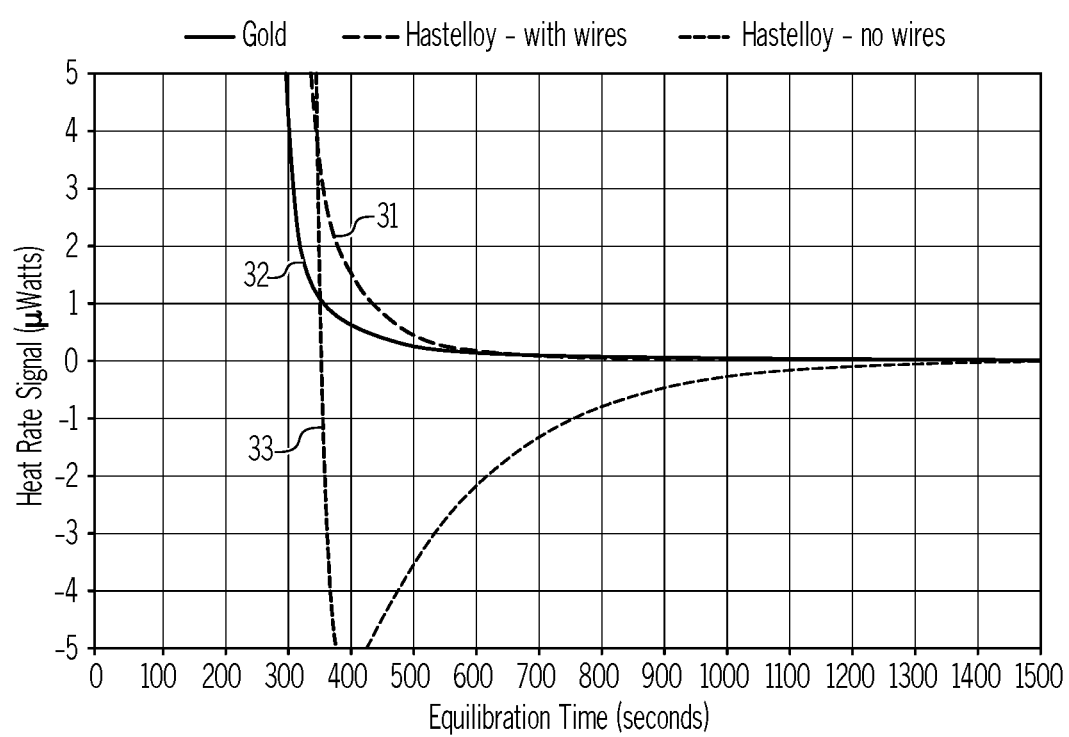
FIG. 5 depicts a graph demonstrating the advantage for equilibration time of the added conductive wires for the sample cell, in accordance with embodiments of the present invention.
Figure 6:
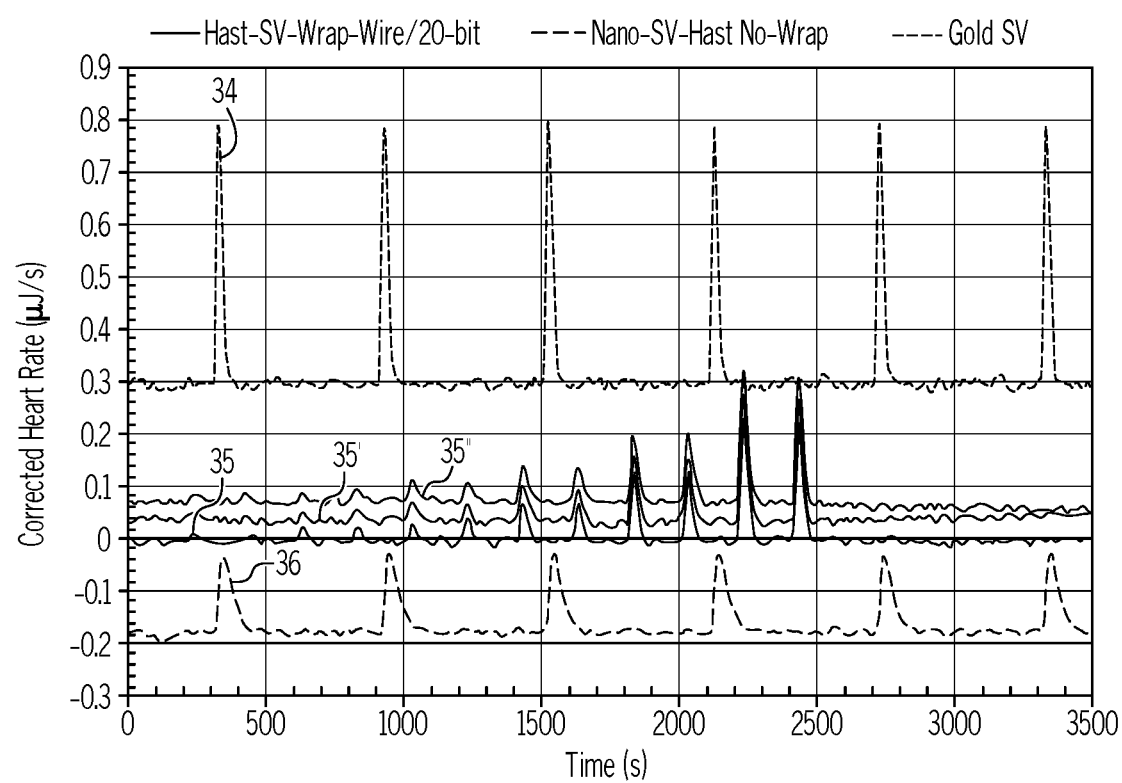
FIG. 6 depicts a graph demonstrating the advantage of the thermally conductive layer 70 on the outside of the sample cell body, in accordance with embodiments of the present invention.

Accordingly, embodiments of calorimeter 300 may include one or more hybrid calorimeter cells, such as one or more sample cells 100 and one or more reference cells 200. The hybrid calorimeter cell utilizes the advantages of a chemically inert material used as the cell body, but also solves the problems associated with poor thermal conductivity of the chemically inert material by coupling a highly thermally conductive material to the chemically inert material. In addition, the conductive wires 20a, 20b further solve issues with delayed equilibrium times associated with the chemically inert, low thermally conductive materials, such as the alloys already described. FIG. 5 depicts a graph demonstrating the advantage for equilibration time of the added conductive wires 20a for the sample cell 100, in accordance with embodiments of the present invention. Line 31 refers to a gold sample cell construction, line 32 refers to a hybrid sample cell 100 construction with conductive wire 20a, and line 33 refers to a sample cell construction with no conductive wires connecting the cell to the thermostat 80, wherein the sample cell is optionally constructed from a HASTELLOY alloy. As shown in the graph of FIG. 5, a time to a stable baseline (i.e. shorter time to base stable baseline is desired because the stable baseline represents equilibrium) of the hybrid cell 100 with wire 20a is very close to the time to stable baseline as line as the gold sample cell with no wires. However, hybrid cell 100 also receives the advantages of a chemically inert sample cell body. The chemically inert cell body without conductive wire 20a takes at least twice the time to reach a stable baseline or equilibrium as the hybrid cell 100. FIG. 6 depicts a graph demonstrating the advantage of the thermally conductive layer 70 on the outside of the sample cell body 50, in accordance with embodiments of the present invention. Line 34 refers to a gold sample cell with 10 µJ heater pulses, lines 35, 35', 35" refers to a sample cell (e.g. cell body 50) with silver (e.g. layer 70) attached to the outside to improve thermal conductivity with various size heater pulses ranging from 0.5 to 8 µJ heater pulses, and lines 36 refers to a sample cell without the silver with 10 µJ heater pulses, wherein the sample cell is constructed from HASTELLOY alloy. In the graph shown in FIG. 6, narrower peaks are desirable. As can be seen in the data, the silver wrap around the cell body 50 makes a significant decrease in the peak width as compared to the cell body without the silver wrap, and comparable peak widths to the gold sample cell. Thus, the hybrid calorimeter cell 70 may solve issues with cells comprised of HASTELLOY alloy pertaining to its low thermal conductive properties, while also retaining its advantages of being chemically inert.

FIG. 7 depicts a schematic view of a calorimeter 300 that may use calorimeter cells 100, 200, in accordance with embodiments of the present invention. Calorimeter 300 may use power compensation to measure a differential heat flow to/from sample cell 100 compared to the heat flow to/from reference cell 200. In other embodiments, the calorimeter 300 may measure the differential heat flux to/from the sample cell 100 with respect to the reference cell 200. Embodiments of calorimeter 300 may have three main subsystems in communication with calorimeter 300: an injection control subsystem, a temperature control subsystem, and a power compensation subsystem.

An injection control subsystem may include a syringe or other substance delivery device that may be used to inject aliquots of a sample of a titrant (such as a ligand) into the sample cell 100 containing an analyte. A needle of the syringe may pass through head space 85, polymer block 84, metallic block 83, heating and cooling TED 81 and thermostat 80, and then enters sample cell 100. Polymer block 84 may be, for example, a PEEK block or a nylon block. Metallic block 83 may be, for example, an aluminum block. Thermostat 80 may be a diffusion bonded block. The injection is carried out under the control of a stepper motor control in a computer via electrical connection, wherein the computer is coupled to the calorimeter. A blade or paddle stirrer 14 at the end of the needle of syringe may be used to stir the sample to ensure that the injected titrant mixes well with the analyte in the sample cell 100.

Temperature control subsystem may include heating and cooling TED 81 which may be controlled by a temperature control algorithm via a temperature control module and an electrical connection. The temperature of thermostat 80 may be measured by a temperature sensor within the thermostat 80 and a temperature measurement module. An output of the temperature measurement module may be provided via an electrical connection as an input to temperature control algorithm in the calorimeter computer so that temperature control algorithm can control the temperature of thermostat 80.

Power compensation subsystem may include sample cell 100, reference cell 200, cooling TED 13 and a sample heater, which may be held within a passive thermal shield 12. The temperature difference between sample cell 100 and reference cell 100 may be measured by TED sensor 11 (shown in FIG. 1). Sample cell 100 may be cooled by cooling TED 13 or heated by a heater. The signal from TED sensor 11 may be provided to a signal amplifier via an electrical connection, and the amplified signal may be provided as the input to feedback control algorithm. Feedback control algorithm may control a power compensation module via an electrical connection to adjust the power to sample heater so as to drive the temperature difference measured by TED sensor 11 to zero. The additional power needed to drive the temperature difference to zero is used as a measure of the differential heat flow to the sample with respect to the reference.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the invention, as required by the following claims. The claims provide the scope of the coverage of the invention and should not be limited to the specific examples provided herein.

What is claimed is:

1. A calorimeter comprising:
   a sample cell;
   a reference cell;
   a thermostat in thermal communication with the sample cell and the reference cell;
   a thermoelectric device (TED) sensor positioned between the sample cell and the reference cell;
   a first conductive wire having a first end connected to the thermostat and a second end connected to the sample cell; and
   a second conductive wire having a first end connected to the thermostat and a second end connected to the reference cell.

2. The calorimeter of claim 1, wherein the first end of the first conductive wire and the first end of the second conductive wire are each connected to the thermostat at a same location on the thermostat.

3. The calorimeter of claim 1, wherein the first end of the first conductive wire and the first end of the second conductive wire are each connected to the thermostat at different locations on the thermostat.

4. The calorimeter of claim 1, further comprising:
   a cooling TED connected to the sample cell; and
   a passive thermal shield enclosing the sample cell, the reference cell, the TED sensor, and the cooling TED.

5. The calorimeter of claim 1, wherein the first and second conductive wires are each insulated by an insulating material to prevent heat loss from the first and second conductive wires.

6. The calorimeter of claim 1, wherein the reference cell has a chemically inert cell body and a thermally conductive layer attached to the chemically inert cell body of the reference cell.

7. The calorimeter of claim 6, wherein the second end of the second conductive wire is attached to the thermally conductive layer of the reference cell.

8. The calorimeter of claim 1, wherein the sample cell has a chemically inert cell body and a thermally conductive layer attached to the chemically inert cell body.

9. The calorimeter of claim 8, wherein the chemically inert cell body has a wall thickness less than 0.0625 inches.

10. The calorimeter of claim 8, wherein the second end of the first conductive wire is attached to the thermally conductive layer attached to the cell body of the sample cell.

11. A method comprising:
    providing the calorimeter of claim 1; and
    establishing a highly thermally conductive path from the thermostat to the sample cell and reference cell with the first and second conductive wires.

12. The method of claim 11, further comprising:
    adjusting a power to a sample heater of the sample cell to drive a temperature difference measured by a thermoelectric sensor positioned between the sample cell and the reference cell to zero.

13. The method of claim 12, further comprising:
    measuring a differential heat flow to a sample in the sample cell with respect to the reference cell by determining an additional power needed to drive the temperature difference measured by the thermoelectric sensor positioned between the sample cell and the reference cell to zero.

14. A method of configuring a calorimeter comprising:
    providing the calorimeter, the calorimeter including:
      a sample cell,
      a reference cell,
      a thermostat in thermal communication with the sample cell and the reference cell,
      a thermoelectric (TED) sensor positioned between the sample cell and the reference cell,
      a first conductive wire having a first end connected to the thermostat and a second end connected to the sample cell, and
      a second conductive wire having a first end connected to the thermostat and a second end connected to the reference cell;
    attaching a thermally conductive layer to an exterior surface of a cell body of the sample cell, the cell body comprising a chemically inert material; and
    connecting the thermally conductive layer to the thermostat of the calorimeter with the first conductive wire.

15. The method of claim 14, wherein the chemically inert material is nickel-molybdenum alloy or a nickel-chromium-molybdenum alloy.

16. The method of claim 14, wherein the thermally conductive layer is comprised of a material selected from the group consisting of: gold, aluminum, copper, and silver.

17. The method of claim 14, wherein the cell body has a wall thickness less than 0.0625 inches, formed from the chemically inert material.

18. The method of claim 14, wherein the reference cell includes a thermally conductive layer and a cell body including a chemically inert material, the method further comprising:
    connecting the thermally conductive layer of the reference cell to the thermostat of the calorimeter with the second conductive wire.

* * * * *